United States Patent [19]

Martin

[11] Patent Number: 4,821,777
[45] Date of Patent: Apr. 18, 1989

[54] DEVICE FOR DAMPING PRESSURE SURGES IN PIPELINES, ESPECIALLY SANITARY INSTALLATIONS

[75] Inventor: Kurt Martin, Sissach, Switzerland

[73] Assignee: R. Nussbaum AG., Olten, Switzerland

[21] Appl. No.: 56,969

[22] Filed: Jun. 3, 1987

[30] Foreign Application Priority Data

Jun. 11, 1986 [CH] Switzerland .................. 02362/86

[51] Int. Cl.[4] ........................................... F16L 55/04
[52] U.S. Cl. ...................................... 138/30; 220/85 B
[58] Field of Search ............... 138/26, 30; 220/85 B; 137/593, 207

[56] References Cited

U.S. PATENT DOCUMENTS

| | | | |
|---|---|---|---|
| 2,725,078 | 11/1955 | Glancy | 138/30 |
| 2,896,667 | 7/1959 | Jumba | 138/30 |
| 2,968,319 | 1/1961 | Ball | 138/30 |
| 3,061,039 | 10/1962 | Peters | 138/26 X |
| 3,556,159 | 1/1971 | Bleasdale | 138/30 |
| 3,621,882 | 11/1971 | Kupiec | 138/30 |
| 4,186,775 | 5/1980 | Muroi | |
| 4,287,917 | 9/1981 | Frey | |
| 4,523,612 | 6/1985 | Kuklo | |
| 4,552,182 | 11/1985 | Graham | 138/30 |
| 4,628,964 | 12/1986 | Sugimura et al. | 138/30 |

FOREIGN PATENT DOCUMENTS 2443637 4/1980 France .

Primary Examiner—James E. Bryant, III
Attorney, Agent, or Firm—Brady, O'Boyle & Gates

[57] ABSTRACT

An annular chamber (8) is formed between a pipeline section (1) and a housing (5, 6) surrounding same. This annular chamber is in communication, via openings (10, 11) in the wall of the pipeline section (1), with the interior (12) of the latter. An air-filled hose ring (16) is arranged in the annular chamber (8). The device damps the pressure surges occurring in domestic installations on account of the rapid closing of quick shutoff elements, for example lever mixers. The danger of damage to the pipelines and fittings is thereby avoided.

8 Claims, 6 Drawing Sheets

DEVICE FOR DAMPING PRESSURE SURGES IN PIPELINES, ESPECIALLY SANITARY INSTALLATIONS

The invention relates to a device for damping pressure surges in pipelines, especially sanitary installations.

BACKGROUND OF THE INVENTION

As is known, pressure surges occur in pipelines when the flowing liquid is shut off. The size of the pressure surge depends herein on the speed with which shutoff takes place. In the older sanitary installations (domestic installations), only minor pressure surges occurred because the usual water faucets (globe valves) could be turned off only gradually. In the quick shutoff elements, especially lever mixers, utilized in more recent installations, however, throughflow can be interrupted abruptly so that a very strong water hammer is encountered. Investigations performed within the framework of this invention revealed that pressure rises of above 20 bar can be produced upon the rapid closing of lever mixers. With such high pressure surges, there is the danger of damage to the installation, especially to the fittings and the joints of plastic pipes.

SUMMARY OF THE INVENTION

The invention is to provide a remedy in this connection. The invention is based on the object of providing a simple and inexpensive device that can be retrofitted effortlessly even in existing installations, this device reducing pressure surges caused by quick shutoff elements to such an extent that the danger of damage to the installation is avoided.

BRIEF DESCRIPTION OF THE DRAWINGS

Embodiments of the invention will be described in greater detail below with reference to the drawings wherein.

DESCRIPTION OF THE PREFERRED EMBODIMENTS

Figure 1:
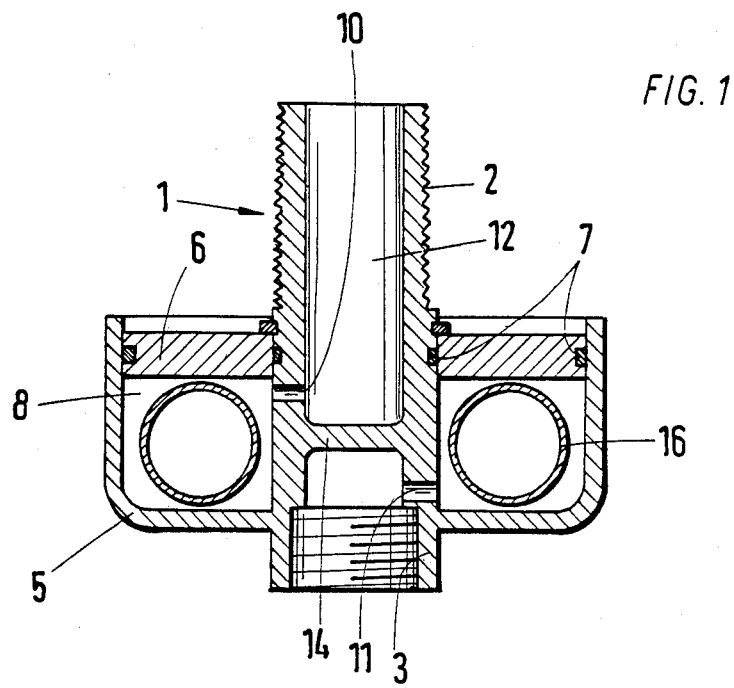
FIG. 1 is a longitudinal section through a device for damping pressure surges.

The device illustrated in FIG. 1 comprises a pipeline section 1 provided on both ends with connecting threads 2, 3 and intended for insertion in a fresh water line of a sanitary installation (domestic installation) in the close proximity to a quick shutoff element, for example between the outlet of the water line and the inlet of a lever mixer. The central part of the pipeline section 1 is surrounded by an annular housing member consisting of a cup 5 formed integrally with the pipeline section 1 and of a lid 6 sealed along the cup rim and at the pipe shell by means of sealing rings 7. The annular chamber 8 formed between the housing member 5, 6 and the pipe shell is in communication with the inner space 12 of the pipeline section 1 by means of two openings 10, 11, mutually offset in the longitudinal direction of the pipeline section 1. The inner space 12 is subdivided by a partition 14 arranged between the two openings 10, 11 so that the water is forced to flow through the annular chamber 8. In the annular chamber 8, a hose ring 16 of a rubber-elastic material is arranged, this hose ring being filled with compressed air. The air pressure in the hose ring 16 is dimensioned to be approximately of the same magnitude as the hydraulic pressure in the pipeline system. In order to ensure leakproofness of the hose ring even over a very long time span, i.e. to prevent diffusion of the air through the hose ring, the rubber-elastic material can be coated with a thin layer, for example of aluminum.

The device can be readily inserted subsequently in an existing sanitary installation of a bathroom, a kitchen, etc., without having to break up the masonry or the wall facing (panels, tiles). It is merely necessary to unscrew the connecting piece of the fitting from the water pipe, insert the device 1 with the connecting thread 2 in the water pipe until the housing member 5 is in contact, with its lid side 6, against the masonry and, respectively, the wall facing, and connect the fitting to the device with the aid of a correspondingly dimensioned connecting piece threaded into the connecting thread 3. The housing member 5 then rests against the masonry or the wall facing—in an esthetically pleasing fashion—in the manner of a customary rosette.

In order to reduce flow resistance, the partition 14 can be equipped with a passage so that the chamber 8 constitutes a bypass.

Figure 2:
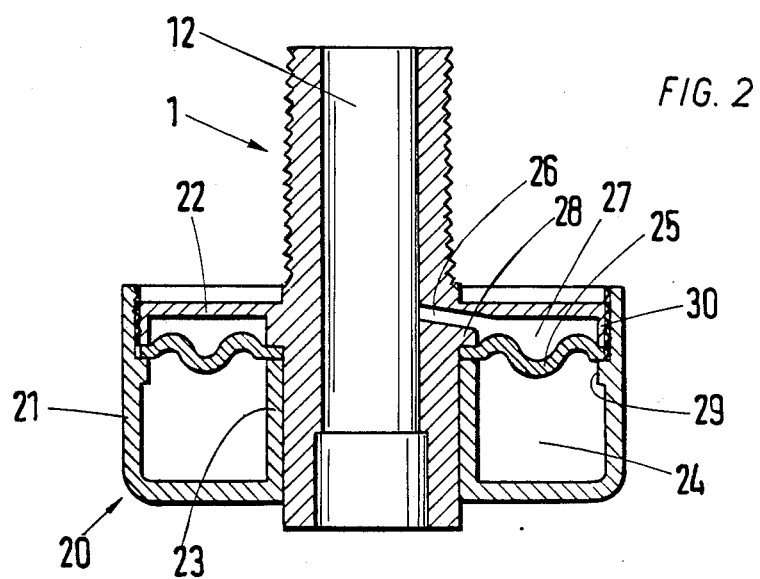
FIGS. 2-6 show longitudinal sections through five versions of the device.

In the version illustrated in FIG. 2, the housing member surrounding the pipeline section 1 consists of a ring 20 having a U-shape in cross section, the outer leg 21 of this ring being threaded onto an annular shouler 22 formed at the pipe section 1 integrally therewith, the inner leg 23 of this ring contacting the pipe jacket. A chamber 24 is formed in the annular space encompassed by the ring 20 and the annular shoulder 22; this chamber is sealed off by an annular diaphragm 25 of a rubber-elastic material from the remaining portion 27 of the annular space, which portion is in communication with the interior 12 of the pipeline section through a bore 26. The inner peripheral rim of the annular diaphragm 25 is clamped in place between the inner leg 23 of the ring 20 and a projection 28 formed at the pipe shell; the outer peripheral rim is clamped in place between a projection 29 at the leg 21 and the angled edge 30 of the annular shoulder 22. The chamber 24 is filled with compressed air, the air pressure (in case of the ready-for-use device which, however, has not as yet been inserted in the pipeline system) corresponding approximately to the operating pressure in the pipeline system. The width of the diaphragm ring 25 is larger than the distance between the clamping points at which its peripheral rims are clamped in place so that the diaphragm, with the pressure in the chamber 24 and in the space 27 being the same, assumes the bellows shape indicated in the drawing. In case of a pressure drop, the diaphragm 25 in FIG. 2 bulges toward the top; in case of a pressure rise, the diaphgragm bulges downwardly and, with a further rise in pressure, expands increasingly into the chamber 24.

Figure 3:
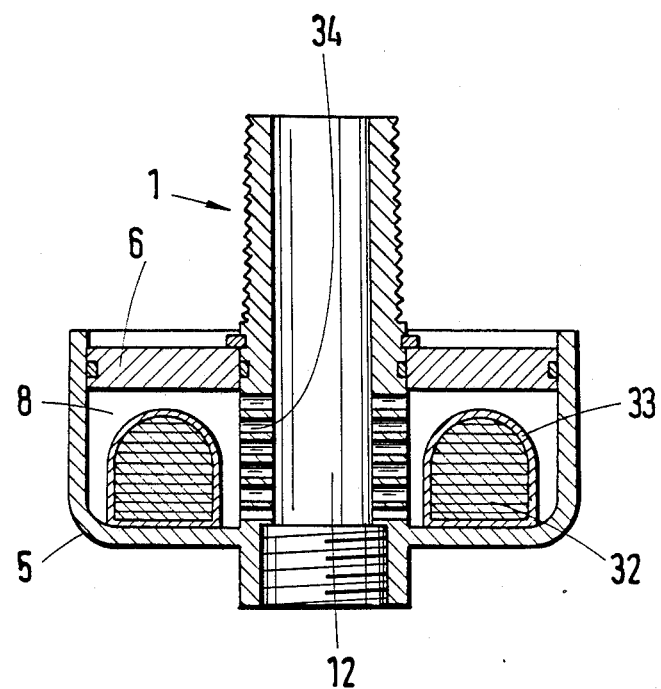

In the version shown in FIG. 3, the housing member 5, 6 surrounding the pipeline section 1 has a configuration indentical to that in the embodiment of FIG. 1. In the annular chamber 8, a ring 32 made of an elastic, open-cell foam material is provided in place of the air-filled hose ring 16. The open-cell foam material is coated with a watertight layer 33 and the latter is glued to the bottom of the cup 5. (When using, instead of the open-cell foam material, a closed-cell foam material, the coating 33 can be omitted.) The entire portion of the pipeline section 1 defining the annular space 8 on the inside is equipped with passages 34 located at small mutual spacings so that the annular space 8 is in communication, as by means of a grid or meshwork, with the interior 12 of the pipeline section 1.

Figure 4:
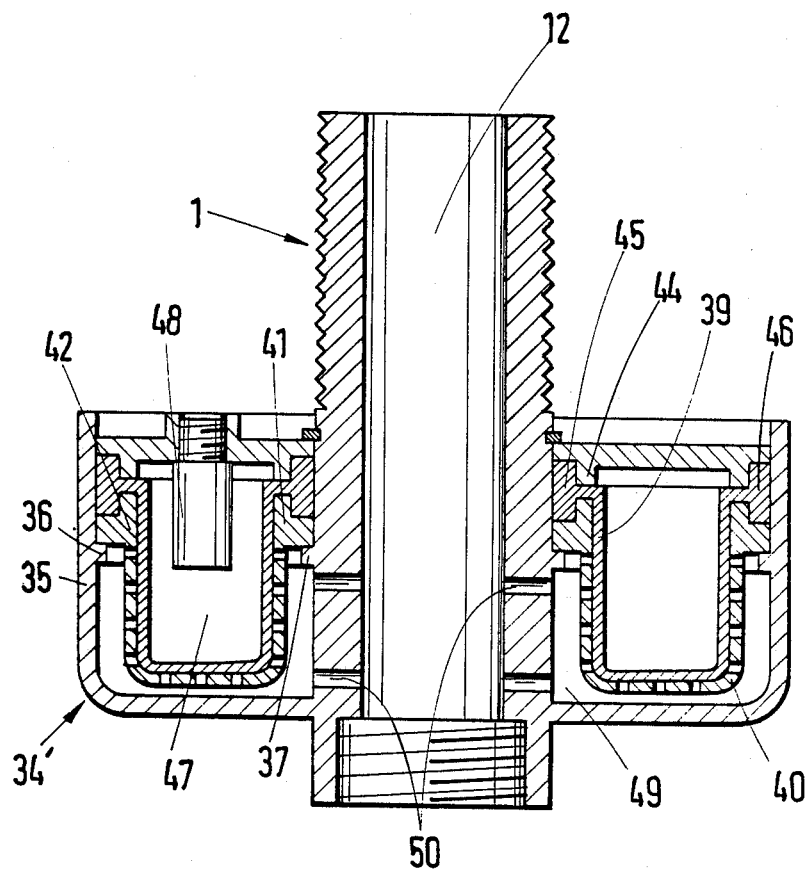

In the version illustrated in FIG. 4, the cup-shaped housing member 34' surrounding the pipeline section 1 carries, on the inside of its wall 35, an annular projection 36, and the pipeline section 1 carries, on the outside of its pipe shell, an annular projection 37. An annular diaphragm or packing member 39 is mounted in an annular screen 40 having a cap-shaped cross section, the inner and outer peripheral edges 41, 42 of this annular screen resting on the projections 36, 37. The housing member 34' is closed off by a lid 44, pressed in place and secured by a clip-on ring. This lid urges the edges 45, 46 of the packing member 39 into close contact with the housing and pipe walls, as well as with the peripheral edges 41, 42 of the screen 40. A check valve 48 is provided in the lid 44 for filling the annular chamber 47 formed between the lid 44 and the packing member 39 with compressed air. The air pressure in the chamber 47 of the ready-for-use device which, however, has not as yet been installed in the pipeline system is set to be equal to or somewhat lower than the hydraulic pressure in the pipeline system. The annular space 49 of a U-shaped cross section, formed between the pipe wall and the housing wall as well as the screen 40, is connected with the inner space 12 of the pipeline section 1 by means of several openings 50 mutually offset in the longitudinal direction of the pipeline section 1. The screen 40 limits the expansion of the packing member 39 so that overstressing or overexpansion is prevented, and the free U-shaped annular space 49 between the pipe wall and the housing wall, as well as the packing member 39, and the cap-shaped and, respectively, U-shaped cross-sectional shape thereof, result in a uniform pressure distribution over the packing member, as well as a large surface area of the latter.

Figure 5:
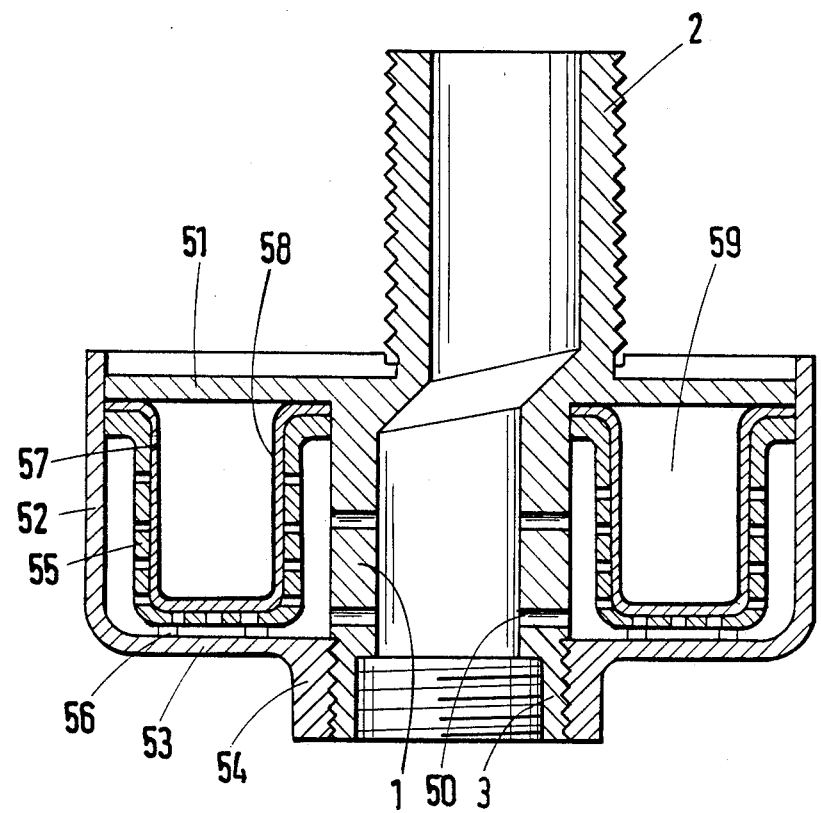

In the version shown in FIG. 5, the housing comprises two connecting adapters 2, 3 axially offset with respect to each other. The pipe section 1 connecting the adapters 2, 3 exhibits, adjoining the adapter 2, a flange 51 wherein a check valve (not shown) is arranged. A cup-shaped housing member 52 is provided, in the center of its bottom 53, with an adapter 54 equipped with an internal thread and threaded onto an external thread of the connecting adapter 3. An annular screen 55 having a cap-shaped cross section rests by means of feet 56 on the inside of the cup bottom 53. In the annular screen 55, a packing member likewise having a cap-shaped cross section is arranged. The packing member consists of a rubber-elastic material 57 coated on the inside with an aluminum layer 58. The packing member 57, 58 and the flange 51 surround a chamber 59 filled with compressed air through the check valve in flange 51. The leak-proofness of the chamber 59 is ensured by the feature that the rim of the packing member 57, 58 is urged, by the edge of the annular screen 55, against the flange 51. This contact pressure is obtained during threaded mounting of the adapter 54 to the connecting adapter 3 in that the cup bottom 53 presses the screen 55, provided with the feet 56, against the flange 51 in the upward direction. The rubber-elastic part 57 of the packing member suitably consists of an elastomer shaped by the press-molding method (for example nitrile rubber NBR, polyolefin rubber EPDM). The aluminum layer 58 can consist of a deep-drawn aluminum foil inserted in part 57 and glued or welded (heat-sealed) preferably at least along the edge to part 57. The aluminum layer 58 can also be applied to the packing member part 57 by vapor-type metallizing, either merely on the inside or additionally also on the outside. The aluminum layer 58 reliably ensures maintenance of the air pressure in the chamber 59 for a practically unlimited time period, i.e. it precludes any air diffusion through pores of the rubber-elastic member 57. The aluminum foil or layer 58 herein is to be selected to be so thin that it has practically no adverse effect on the deformability of the rubber-elastic member 57. The aluminum foil, rolled to a very low thickness and deep-drawn, can be softannealed after deep-drawing so that it again loses its stiffness imparted to it by rolling and deep-drawing, i.e. so that it becomes maximally pliable. The rubber-elastic part 57, for the aforementioned reasons, could also be coated with another nonporous material (another metal, or a suitable synthetic resin). However, aluminum is especially well suitable with respect to leakproofness as well as deformability.

Figure 6:
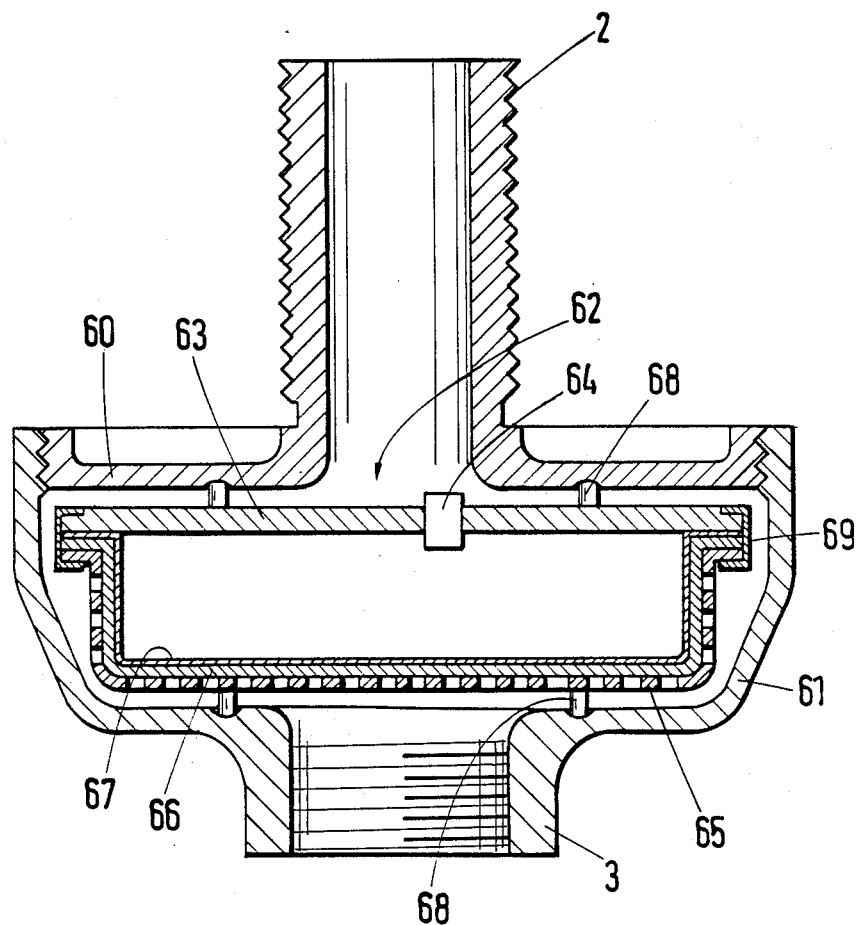

In the version illustrated in FIG. 6, the housing consists of two part. The first part has a connecting adapter 2 to be threaded into a water line and carrying a flange 60 with an external thread. The second part has an adapter 3 to be connected to a conencting piece of a fitting, this adapter being formed in the bottom of a cup-shaped housing member 61. The rim of the cup-shaped housing member 61 is provided with an internal thread and is threaded onto the external thread of the flange 60. A box or capsule 62 is inserted in the interior of the housing part 61. The capsule 62 has a lid 63 in which is mounted a filling nipple or a check valve 64, and a cap-shaped screen 65 wherein a likewise cup-shaped diaphragm 66 is seated. The diaphragm, just as the packing member 57, 58 in FIG. 5, consists of a rubber-elastic material 66, the inside of which is coated with a thin layer of aluminum or an aluminum layer foil 67, which is also capshaped as shown in FIG. 6;. The thickness or axial dimension and the diameter of the capsule 62 are dimensioned to be smaller than the cup-shaped space between the housing member 61 and the flange 60. Webs or spacer elements 68 are arranged at the lid 63 and at the screen bottom 65, these webs or spacer elements engaging into indentations of the housing member 61 and of the flange 60 and maintaining the capsule 62 at a distance from the flange 60 and from the housing member 61, as shown in FIG. 6 so that the water can flow from the adapter 2 around the whole box or capsule 62 through the interior of housing member 61 into the adapter 3. The edges of the screen 65, of the diaphragm 66, 67, and of the lid 63 are tightly glued or welded together and are additionally sealed off by means of a sealing ring 69. The sealed capsule chamber enclosed by the lid 63 and the diaphragm 66, 67 is filled with compressed air.

The capsule 62 is completely finished before insertion in the housing and is filled with compressed air through the filling adapter 64, whereupon the latter is sealed with a sealing compound. The capsule 62 is then inserted in the housing member 61, and the latter is threaded with the internal thread of its rim onto the outer thread of the flange 60. In this step, the edge or brim portion of the diaphragm 66, 67 is compressed between the rims or brim portions of the lid 63 and of the screen 65 because the bottom of the housing member 61 presses the screen 65 via the webs or spacer elements 68 against the lid 63, supported on the flange 60 by means of the webs or spacer elements 68. Due to this contact pressure connection, the leakproofness of the joint formed by the diaphragm 66, 67 and the lid 63 remains intact over a practically unlimited time period.

The elastically compressible means provided in each of the devices in the housing chamber (the air-filled hose ring 16 in FIG. 1; the air cushion in the chamber 24 with the diaphragm 25 in FIG. 2; the foam ring 32 in FIG. 3; the air cushion in the chamber 47 with the diaphragm 39 in FIG. 4; the air cushion in the chamber 59 with the packing member 57, 58 in FIG. 5; the air cushion in the capsule 62 with the diaphragm 66, 67 in FIG. 6) reduces the pressure surges occurring in domestic installations due to the rapid closing of quick shutoff elements, e.g. lever mixers. The air cushions in the hose ring 16 and in the chamber 24, 49, 59, 62 have the advantage that they absorb the pressure rise very rapidly; the foam material 32 has the advantage of providing greater friction and thus improved damping of pressure vibrations. It is also possible to arrange in the housing space several elastically compressible means, for example an air-filled hose ring and a foam ring, to obtain rapid pressure absorption as well as good vibration damping. Since the space is formed in a housing member projecting radially past the pipe connecting elements 2, 3, the elastically compressible means can be made of an adequately large dimension to sufficiently reduce even very extensive water hammer. Decisive factors for pressure reduction are the size of the compressible volume (of the air volume in the hose ring 16 or in the chambers 24, 47, 59, or of the foam volume 32), as well as of the deformable surface area (elastic or flexible wall 16, 25, 33, 39, 57/58, 66/67). The pressure surge damping is the more satisfactory, the larger the volume and the deformable surface area. Preferably, the outer diameter of the housing member wherein the space is formed for accommodating the elastically compressible means is at least twice as large as the outer diameter of the connecting adapters. In the embodiments, the outer diameter of the housing member 5, 20, 34', 52, 61 is triple the outer diameter of the adapters 2, 3. Experiments have shown that, for example, with the embodiment of FIG. 4, pressure peaks of 26 bar are reduced to 8.5 bar. The housing member 5, 20, 34', 52, 61 can, as has been demonstrated, be made of an esthetically pleasing design and can be mounted outside of the masonry in the manner of a rosette. The illustrated devices can also be readily retrofitted without altering the installation.

Figure 7:
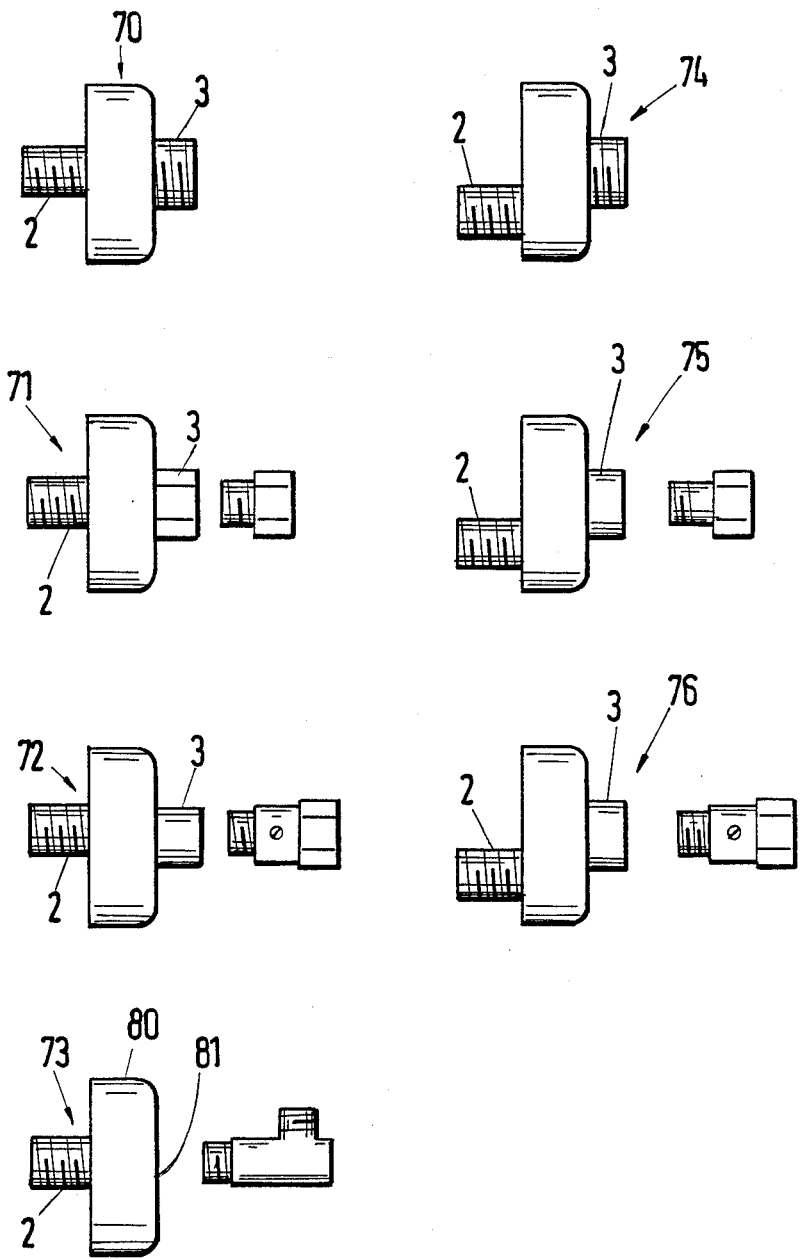
FIG. 7 shows schematic views of devices equipped with differing connecting adapters, with examples of connecting pieces to be joined to the adapters.

FIG. 7 shows schematically how the device can be designed for connecting various adapters. The devices 70–72, in correspondence with the embodiments of FIGS. 1–14 4 and 6, have connecting adapters 3 coaxial to the connecting adapter 2 for the water pipe; these adapters 3 are designed, depending on the connecting piece provided, with an external thread (adapter 3 of 70) or an internal thread (adapter 3 or 71 and 72). The device 73 exhibits, in housing member 80, an internal thread 81 coaxial to the connecting adapter 2 for the water pipe, for the threading of an elbow piece, for example. The devices 74–76 comprise connecting adapters 2, 3 axially offset with respect to each other, and are intended for the connecting of hot and cold water fittings with a differing installation gauge; in this connection, the spacing of the adapters 3 of two devices 74–76 mounted side-by-side can be adjusted by means of a corresponding turning of the two devices.

I claim:

1. A device for damping pressure surges in pipelines for liquid, comprising
   a housing composed of two parts (2, 60, 3, 61) and surrounding a cup-shaped space having a diametrical dimension greater than the axial dimension thereof,
   each of said housing parts having a pipe connection member (2, 3) communicating with said cup-shaped space at opposite sides thereof and a housing wall part (60, 61) projecting radially past said pipe connection members (2, 3),
   a box or capsule (62) adapted to and inserted in said cup-shaped space between the two housing parts (60, 61),
   said box or capsule having a rigid outer wall (63, 65) composed of a lid portion (63) and a mating cap-shaped portion (65), said cap-shaped portion (65) having a brim portion and having openings, a cap-shaped flexible or elastic member (66, 67) juxtapositioned inside said cap-shaped portion, said cap-shaped flexible or elastic members (66, 67) having a brim portion tightly connected between the brim portion of said cap-shaped portion (65) and said lid portion (63), said rigid outer wall (63, 65) and said cap-shaped flexible or elastic member (66, 67) surrounding a sealed chamber filled with a pressurized gas,
   said box or capsule (62) having an axial dimension and a diametrical dimension greater than the axial dimension and being positioned coaxial in the cup-shaped space within the housing wall part (60, 61) between said pipe connection members (2, 3) and projecting radially past the latter, and spacer elements (68) maintaining said box or capsule at a spacing from the housing wall part (60, 61), so that liquid may flow around the whole box or capsule, said housing wall part (60, 61) comprising a pair of mating housing wall parts surrounding the cup-shaped space, each of said housing wall parts (60, 61) of said pair having a rim portion having a thread for releasably and tightly threading together the pair of housing parts (60, 61) in the axial direction, said box or capsule (62) is brought into a contact pressure connection via said spacer elements (68) with said housing parts (60, 61) and can be easily exchanged by threading said pair of housing parts (60, 61).

2. A device according to claim 1, in which one of said housing parts has a flange (60) and the other has a cup-shaped housing member (61), said flange (60) and said cup-shaped housing member (61) surrounding said cup-shaped space and each having a said rim portion provided with a thread.

3. A device according to claim 1, in which said cap-shaped flexible or elastic member consists of a diaphragm of an elastomer (66) which is covered at least at one side by a pliable metal foil (67), said pliable metal foil (67) extending in a leakproof arrangement over the whole elastomer diaphragm (66) in order to prevent diffusion of the pressurized gas through the elastomer diaphragm (66) out of the sealed chamber thereby ensuring a long-term maintenance of the gas pressure in said sealed chamber.

4. A device according to claim 3, in which the pliable metal foil (67) consists of a cap-shaped aluminum foil (67) inserted in the elastomer diaphragm (66) of the same cap-shape, said cap-shaped aluminum foil (67) having a brim portion, and both the brim portion of said cap-shaped aluminum foil (67) and the brim portion of said cap-shaped elastomer diaphragm (66) being tightly connected between the brim portion of said cap-shaped wall portion (65) and said lid portion (63).

5. A device according to claim 1, in which said pipe connection members (2, 3) are axially offset with respect to each other for connecting of hot and cold water fittings with a different installation gauge.

6. A device according to claim 1, in which said cap-shaped wall portion (65) of said box or capsule having openings is a screen (65).

7. A device according to claim 1, in which the pressure of the pressurized gas is approximately as high as the hydraulic pressure in the pipeline system.

8. A device for damping pressure surges in pipelines for liquid, comprising a housing (60, 61) composed of two parts and surrounding a cup-shaped space, each of said housing parts (60, 61) having a pipe connection member (2, 3) communicating with said cup-shaped space at opposite sides thereof and a housing wall part (60, 61) projecting radially past said pipe connection members (2, 3), so that the sectional area of the housing (60, 61) surrounding the cup-shaped space is greater than the sectional area of the pipe connection member, one of said housing parts has a flange (60) and the other has a cup-shaped housing member (61), said flange (60) and said cup-shaped housing member (61) surrounding said cup-shaped space, a box or capsule (62) adapted to and inserted in said cup-shaped space between the two housing parts (60, 61), said box or capsule having a wall (63, 65) at least a portion of which having openings and a flexible or elastic member (67) inside said wall portion, said wall and said flexible or elastic member (67) surrounding a sealed chamber filled with a pressurized gas, said box or capsule being arranged between said pipe connection members (2, 3) projecting radially past the latter, and spacer elements (68) being arranged at opposite sides of said box or capsule facing said flange (60) and said cup-shaped housing member (61), and said flange (60) and said cup-shaped housing member (61) having indentations into which the spacer elements (68) engage thereby maintaining the box or capsule at a spacing from the flange (60) and the cup-shaped housing member (61), so that liquid may flow around the whole box or capsule.

* * * * *